(12) United States Patent
Ogura et al.

(10) Patent No.: US 10,191,492 B2
(45) Date of Patent: Jan. 29, 2019

(54) PARALLEL TRAVEL WORK SYSTEM

(71) Applicant: YANMAR CO., LTD., Chayamachi, Kita-ku, Osaka-shi, Osaka (JP)

(72) Inventors: Kouhei Ogura, Chaya-machi (JP); Akifumi Kuroda, Chaya-machi (JP); Keiji Matsumoto, Chaya-machi (JP); Hideaki Aoki, Chaya-machi (JP)

(73) Assignee: Yanmar Co., Ltd., Osaka-shi (JP)

(*) Notice: Subject to any disclaimer, the term of this patent is extended or adjusted under 35 U.S.C. 154(b) by 122 days.

(21) Appl. No.: 15/115,853

(22) PCT Filed: Feb. 6, 2015

(86) PCT No.: PCT/JP2015/053444
§ 371 (c)(1),
(2) Date: Aug. 1, 2016

(87) PCT Pub. No.: WO2015/119266
PCT Pub. Date: Aug. 13, 2015

(65) Prior Publication Data
US 2017/0177002 A1 Jun. 22, 2017

(30) Foreign Application Priority Data

Feb. 6, 2014 (JP) ................................ 2014-021759
Oct. 21, 2014 (WO) .................. PCT/JP2014/077906

(51) Int. Cl.
*G05D 1/02* (2006.01)
*A01B 69/04* (2006.01)

(52) U.S. Cl.
CPC ......... *G05D 1/0278* (2013.01); *A01B 69/008* (2013.01); *G05D 1/0295* (2013.01); *G05D 2201/0201* (2013.01)

(58) Field of Classification Search
CPC ............... G05D 1/0278; G05D 1/0295; G05D 2201/0201; A01B 69/008
See application file for complete search history.

(56) References Cited

U.S. PATENT DOCUMENTS 5,774,069 A * 6/1998 Tanaka ..................... B60T 7/12
180/167
6,148,255 A    11/2000 Van Der Lely
(Continued)

FOREIGN PATENT DOCUMENTS

EP    1 967 931       9/2008
JP    04-316415      11/1992
(Continued)

OTHER PUBLICATIONS

Suzuki, JP2003063373, Mar. 5, 2003 (machine translation).*
(Continued)

*Primary Examiner* — Courtney D Heinle
(74) *Attorney, Agent, or Firm* — Norton Rose Fulbright US LLP

(57) ABSTRACT

An autonomous travel work vehicle (1), which is provided with a position calculation means that measures the device body position by means of a satellite positioning system, a steering actuator (40) that operates a steering device, an engine rotation control means, a transmission means (44), and a control device (30) that controls each of same, is caused to autonomously travel, along a set travel path stored in the control device (30), by an accompanying travel work vehicle (100) that works while accompanying the travel of the autonomous travel work vehicle (1) by means of attended operation and that is mounted with a remote operation device (112) that can operate the autonomous travel work vehicle, and the control device (30) halts autonomous travel when a signal disruption from the satellites, a (Continued)

large deviation from the set travel path, an abnormal sensor value, fuel exhaustion, or the like is detected.

6 Claims, 13 Drawing Sheets

(56) References Cited

U.S. PATENT DOCUMENTS

| | | | |
|---|---|---|---|
| 8,046,139 B2 | 10/2011 | Diekans et al. | |
| 9,164,513 B2 | 10/2015 | Matsuzaki et al. | |
| 2006/0279245 A1* | 12/2006 | Hashimoto | B25J 9/1674 318/568.12 |
| 2007/0233348 A1* | 10/2007 | Diekhans | A01B 69/008 701/50 |
| 2008/0294309 A1* | 11/2008 | Kaprielian | A01B 69/008 701/27 |
| 2009/0248231 A1* | 10/2009 | Kamiya | G05D 1/0061 701/23 |
| 2013/0289832 A1* | 10/2013 | Pirotais | A01B 69/008 701/50 |
| 2014/0216314 A1* | 8/2014 | Bourgault | A01C 21/005 111/174 |
| 2014/0277675 A1* | 9/2014 | Anderson | G05B 15/02 700/114 |
| 2014/0277899 A1* | 9/2014 | Matsuzaki | G05D 1/0287 701/25 |
| 2015/0105965 A1* | 4/2015 | Blackwell | A01B 59/002 701/28 |

FOREIGN PATENT DOCUMENTS

| | | |
|---|---|---|
| JP | 10-066403 | 3/1998 |
| JP | H1066405 | 3/1998 |
| JP | H1066406 | 3/1998 |
| JP | H11266608 | 10/1999 |
| JP | 2000-014208 | 1/2000 |
| JP | 2000-023531 | 1/2000 |
| JP | 200029522 | 1/2000 |
| JP | 2000-186349 | 7/2000 |
| JP | 2002-354905 | 12/2002 |
| JP | 2003-061882 | 6/2003 |
| JP | 2004008053 | 1/2004 |
| JP | 2004136837 | 5/2004 |
| JP | 2005 215742 | 8/2005 |
| JP | 2005215742 | 8/2005 |
| JP | 2005-238904 | 9/2005 |
| JP | 2005238904 | 9/2005 |
| JP | 2006218548 | 8/2006 |
| JP | 2006-341356 | 12/2006 |
| JP | 2008131880 | 6/2008 |
| JP | 2008-250995 | 10/2008 |
| JP | 2010079494 | 4/2010 |
| JP | 2014-178759 | 9/2014 |
| JP | 2014178759 | 9/2014 |

OTHER PUBLICATIONS

Yamaguchi, JP2008131880, Jun. 12, 2008 (machine translation).*
Nagano, JP2000186349, Jul. 4, 2000 (machine translation).*
EP15746411.6, Extended European International Search Report dated Sep. 28, 2017, 8 pages—English.
PCT/JP2015/053444 International Search Report and Written Opinion dated Mar. 17, 2015, 8 pages—Japanese; 4 pages—English.

* cited by examiner

PARALLEL TRAVEL WORK SYSTEM

CROSS REFERENCE TO RELATED APPLICATION

This application relates to claims priority from SN. PCT/JP2015/053444 filed Feb. 6, 2015, the entire contents of which are incorporated herein by reference, which in turn claims priority form SN PCT/JP2014/077906 filed Oct. 21, 2014 and JP Ser. No. 2014-021759 filed Feb. 6, 2014.

FIGURE SELECTED FOR PUBLICATION

FIG. 11

BACKGROUND OF THE INVENTION

Field of the Invention

The present invention relates to a control technique of an autonomously-traveling unmanned work vehicle when this unmanned work vehicle and a manned work vehicle accompanying the unmanned work vehicle carry out an operation together.

Description of the Related Art

According to a conventionally known technique, a work vehicle that runs within an operation field of a predetermined range is provided with a vehicle-side receiving station for receiving a satellite signal from a GPS satellite to determine the current location of the work vehicle, while a monitor-side receiving station is set up outside and near the operation field for receiving a satellite signal from a GPS satellite to determine the current location of a monitoring device, to detect a relative distance between the work vehicle and the monitoring device through communication between them, and when the work vehicle goes off a monitorable range, an alarm is set off, and the traveling is stopped (see, for example, Patent Document 1).

PRIOR ART DOCUMENT

Patent Document

Patent Document 1: JP-A 9-146635 Gazette

ASPECTS AND SUMMARY OF THE INVENTION

According to the technique described above, traveling is continued until the vehicle goes off a monitorable range, and there is a risk that the operation is carried out also outside of a preset work area, which is wasteful, and requires post processing.

The present invention was made in view of the circumstances noted above and directed to enable highly precise operation by stopping an autonomous travel work vehicle before it goes off a preset travel path.

Solution to the Problems

The problem to be solved by the present invention is as noted above. Solutions to this problem are set forth below.

Namely, the present invention provides a parallel travel work system, wherein an autonomous travel work vehicle includes a position calculator that determines the position of a vehicle body with the use of a satellite positioning system, a steering actuator that activates a steering system, an engine rpm controller, a speed change means, and a controller that controls all these. The autonomous travel work vehicle is controlled to run automatically along a preset travel path stored in the controller, and controllable through a remote controller that is mounted on an accompanying travel work vehicle accompanying and operating with the autonomous travel work vehicle, or carried by an operator. The controller controls the autonomous travel work vehicle to stop the autonomous traveling when a signal from a navigation satellite assumes an abnormal value.

According to the present invention, the controller controls the vehicle to stop traveling when an actual position is deviated from a preset travel path by more than a preset range.

According to the present invention, the controller controls the vehicle to stop traveling when a detected value from a steering sensor that detects a steering direction is an abnormal value.

According to the present invention, the controller controls the vehicle to stop traveling when a difference between a detected value from an orientation and direction sensor and a target value reaches or exceeds a preset value.

According to the present invention, the controller is connected to a level sensor provided in a fuel tank and controls the vehicle to stop traveling when a remaining amount of fuel is not more than a preset value.

According to the present invention, when the traveling is stopped, the controller transmits a cause of the stop to a remote controller provided in the accompanying travel work vehicle and shows the cause on a display of the remote controller.

Effects of the Invention

With the use of the means described above, the autonomous travel work vehicle stops traveling when an abnormality arises in a detected value from a sensor provided in the vehicle, so that the vehicle does not go off a target travel path and carry out the operation correctly, and a damage or an accident can be prevented.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
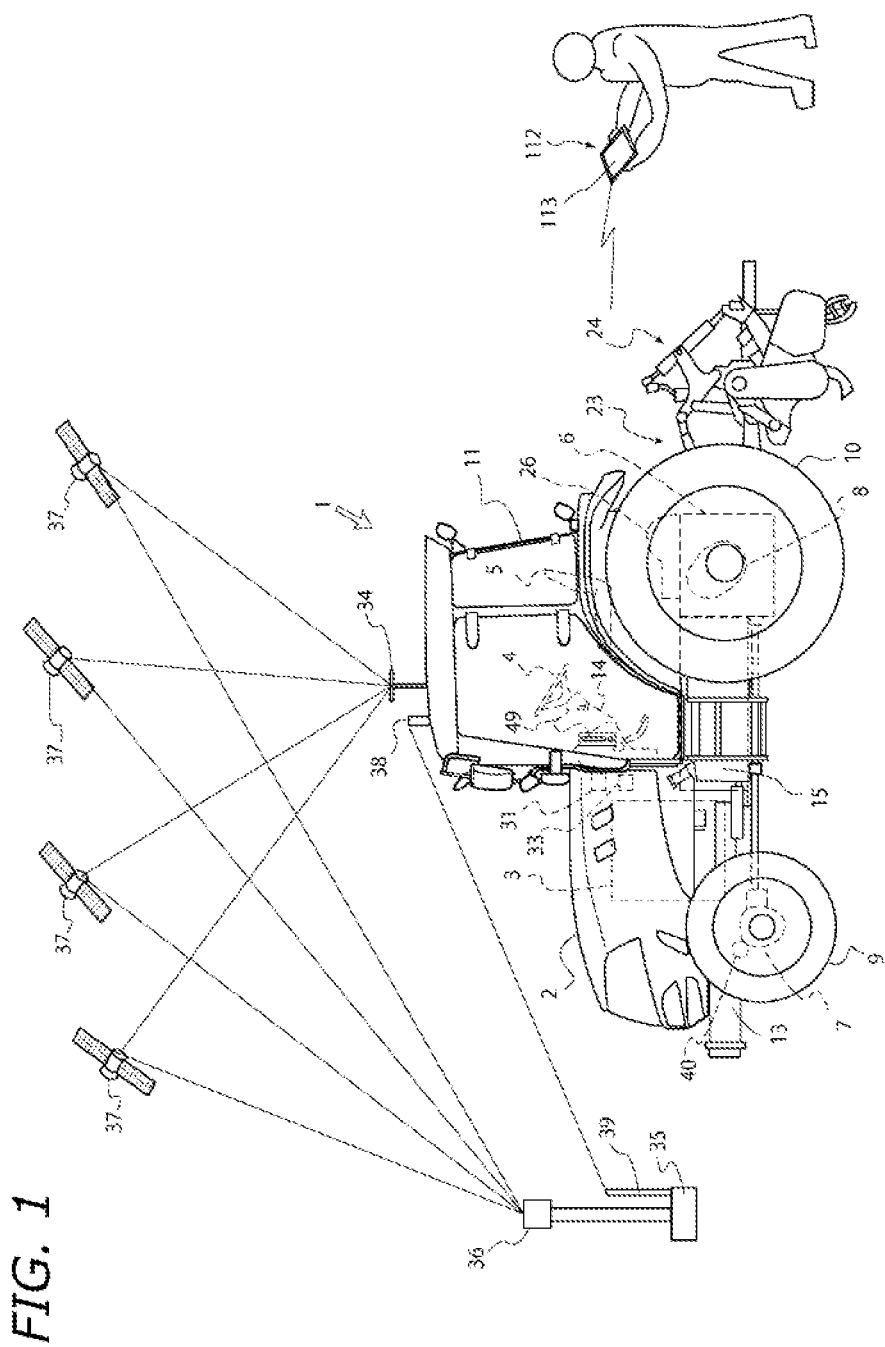
FIG. 1 is a schematic side view illustrating an autonomous travel work vehicle, GPS satellites, and a reference station.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

One embodiment will be described, wherein an unmanned, autonomous travel work vehicle 1 capable of autonomously-traveling and a manned, accompanying travel work vehicle 100 steered by an operator to accompany the autonomous travel work vehicle 1 are tractors, with a rotary tiller attached to each of the autonomous travel work vehicle 1 and the accompanying travel work vehicle 100 as an implement. However, the work vehicles are not limited to tractors, but may be a combine harvester or the like. Moreover, the implement is not limited to the rotary tiller, but may be a furrower, a mower, a rake, a seeder, a manure spreader, a wagon, and the like.

Figure 2:
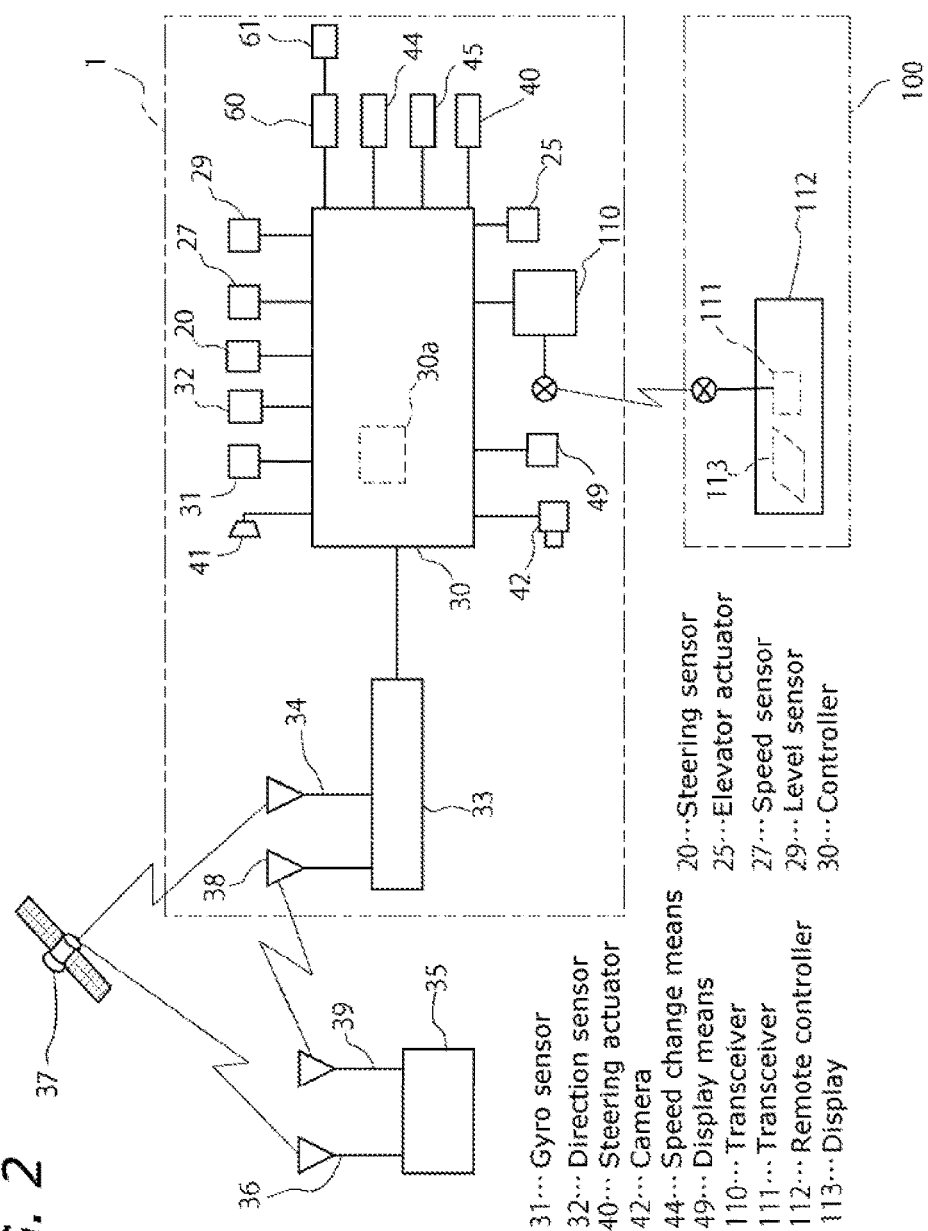
FIG. 2 is a control block diagram.

The entire structure of the tractor, which is the autonomous travel work vehicle 1 will be described with reference to FIG. 1 and FIG. 2. An engine 3 is housed inside a hood 2, and a dashboard 14 is provided inside a cabin 11 behind the hood 2, with a steering handle 4, which constitutes a steering control means, on the dashboard 14. Rotating the steering handle 4 turns front wheels 9, 9 to various directions via a steering system. The steering direction of the autonomous travel work vehicle 1 is detected by a steering sensor 20. The steering sensor 20 is an angle sensor such as a rotary encoder and disposed at the base of rotating parts of the front wheels 9. The detection mechanism of the steering sensor 20 is not limited and may be any system whereby the steering direction can be recognized. Rotation of the steering handle 4 may be detected, or an amount of steering in a power steering system may be detected. Detected values obtained by the steering sensor 20 are input to a controller 30.

A driver's seat 5 is located behind the steering handle 4, and a transmission case 6 is disposed below the driver's seat 5. Rear axle cases 8, 8 are connected to the transmission case 6 on both left and right sides, and rear wheels 10, 10 are supported on the rear axle cases 8, 8 via axles. Power from the engine 3 is transmitted at varying speed ratios by a transmission (main gear box and auxiliary gear box) inside the transmission case 6 to drive the rear wheels 10, 10. A hydraulic stepless transmission can constitute the transmission, for example, wherein a swash plate of a variable capacity hydraulic pump is actuated by a speed change means 44 such as a motor to enable gear changes. The speed change means 44 is connected to the controller 30. The number of rotation of the rear wheels 10 is detected by a speed sensor 27 and input as a traveling speed to the controller 30. The method for detecting the vehicle speed and the location of the speed sensor 27 are not limited to particular ones.

A PTO (power takeoff) clutch and a PTO transmission are encased in the transmission case 6. The PTO clutch is turned on and off by a PTO switch 45. The PTO switch 45 is connected to the controller 30 so that the power transmission to the PTO shaft can be engaged and disengaged.

A front axle case 7 is supported on a front frame 13 that carries the engine 3. The front wheels 9, 9 are supported via bearings on both sides of the front axle case 7, so that the power from the transmission case 6 can be transmitted to the front wheels 9, 9. The front wheels 9, 9 are the steering wheels, so that they can be turned when the steering handle 4 is rotated. The front wheels 9, 9 can be turned to left and right by a steering actuator 40, which is a power steering cylinder that constitutes a steering drive means. The steering actuator 40 is connected to the controller 30 and driven under autonomous traveling control.

An engine controller 60 that is an engine rpm controller is connected to the controller 30. An engine rpm sensor 61, a water temperature sensor, a hydraulic sensor and the like are connected to the engine controller 60, to detect the condition of the engine. The engine controller 60 detects a load from a preset rpm and an actual rpm and executes control to avoid overloading, as well as transmits the condition of the engine 3 to a remote controller 112 to be described later for presentation on a display 113 that constitutes a display means.

A level sensor 29 that detects the fuel level is disposed in a fuel tank 15 below steps and connected to the controller 30, while a fuel gauge that shows the remaining amount of fuel is provided in a display means 49 on the dashboard of the autonomous travel work vehicle 1 and connected to the controller 30. The controller 30 transmits information on the remaining amount of fuel to the remote controller 112, and the remaining amount of fuel and operable time are indicated on the display 113 of the remote controller 112.

The display means 49 that displays an engine revolution counter, a fuel gauge, a hydraulic pressure and the like, a monitor indicating an abnormality, a setting values or the like is disposed on the dashboard 14.

A rotary tiller 24 is mounted as an implement such as to be movable up and down via an implement attachment system 23 at the back of the tractor body for tilling operation. An elevator cylinder 26 is provided on the transmission case 6. An elevator arm that constitutes the implement attachment system 23 is rotated by extending and contracting the elevator cylinder 26, so that the rotary tiller 24 can be moved up and down. The elevator cylinder 26 is extended and contracted by operation of an elevator actuator 25. The elevator actuator 25 is connected to the controller 30.

A moving receiver 33 that constitutes a satellite positioning system is connected to the controller 30. A moving GPS antenna 34 and a data receiving antenna 38 are connected to the moving receiver 33. The moving GPS antenna 34 and data receiving antenna 38 are provided on the cabin 11. The moving receiver 33 includes a position calculator for determining positions and transmits latitudes and longitudes to the controller 30, so that the current location can be known. Using a global navigation satellite system (GNSS) such as Japanese quazi-zenith satellites system or Russian GLONASS satellite navigation system in addition to the American GPS system can provide highly accurate positioning, but this embodiment will be described as using the GPS.

The autonomous travel work vehicle 1 is equipped with a gyro sensor 31 for obtaining information on changes in orientation of the vehicle body, and a direction sensor 32 for detecting the moving direction, these sensors being connected to the controller 30. Note, the direction sensor 32 may be omitted, since the direction of movement can be calculated from the position measurements using the GPS.

The gyro sensor 31 detects angular velocities of angles in the front-to-back direction (pitch) and left-to-right direction (roll), and turning angle (yaw) of the vehicle body of the autonomous travel work vehicle 1. Through integration of these three angular velocities, the pitch and roll angles in the front-to-back direction and left-to-right direction, and the yaw angle of the vehicle body of the autonomous travel work vehicle 1 can be determined. Specific examples of the gyro sensor 31 include mechanical gyros, fiber optic gyros, fluid gyros, vibration gyros, and so on. The gyro sensor 31 is connected to the controller 30 and inputs information on the three angular velocities to the controller 30.

The direction sensor 32 detects the direction (of movement) of the autonomous travel work vehicle 1. Specific examples of the direction sensor 32 include magnetic direction sensors and the like. The direction sensor 32 is connected to the controller 30 and inputs information on the direction of the vehicle body to the controller 30.

The controller 30 thus determines the orientation of the autonomous travel work vehicle 1 (direction and pitch, roll, and yaw of the vehicle body) through processing of signals obtained from the gyro sensor 31 and direction sensor 32 using an orientation/direction calculator.

Next, the method for acquiring position information of the autonomous travel work vehicle 1 with the use of the GPS (Global Positioning System) will be described.

The GPS was originally developed as a navigation aid for aircraft, ships, and the like. The system is made up of 24 GPS satellites (4 each in 6 orbital planes) orbiting at about 20,000 km, a control station that tracks and controls the GPS satellites, and users' receivers for the positioning.

There are various positioning methods that use the GPS, including single positioning, relative positioning, differential GPS (DGPS) positioning, and real-time kinematic GPS positioning, any of which can be used. In this embodiment, the RTK-GPS positioning that provides high measurement accuracy is adopted, and this method will be described with reference to FIG. 1 and FIG. 2.

RTK (Real Time Kinematic) GPS positioning is a technique in which GPS surveying is performed simultaneously at a reference station whose position is known and at a moving station whose position is being determined, and data obtained at the reference station is transmitted to the moving station in a wireless manner or via other methods in real time so as to determine the position of the moving station in real time based on the position results of the reference station.

In this embodiment, the moving receiver 33, the moving GPS antenna 34, and the data receiving antenna 38, which constitute the moving station, are disposed on the autonomous travel work vehicle 1, while a fixed receiver 35, a fixed GPS antenna 36, and a data transmitting antenna 39, which constitute the reference station, are located at a predetermined position where it will not obstruct operations in the agricultural field. In the RTK (Real Time Kinematic) GPS positioning in this embodiment, phase measurements are carried out both in the reference station and the moving station (relative positioning), and the positioning data obtained by the fixed receiver 35 of the reference station is transmitted from the data transmitting antenna 39 to the data receiving antenna 38.

The moving GPS antenna 34 arranged in the autonomous travel work vehicle 1 receives signals from GPS satellites 37, 37. The signals are transmitted to the moving receiver 33 for determining its position. At the same time, the fixed GPS antenna 36 at the reference station receives signals from the GPS satellites 37, 37, and the fixed receiver 35 determines its position, transmits data to the moving receiver 33, and determines the position of the moving station by analyzing the surveyed data. The position information thus obtained is transmitted to the controller 30.

The controller 30 in the autonomous travel work vehicle 1 thus obtains position information of the vehicle body determined by the moving receiver 33 from the radio waves transmitted from the GPS satellites 37, 37 at predetermined time intervals, and obtains information on the changes in orientation and direction of the vehicle body from the gyro sensor 31 and the direction sensor 32. Based on the position information and the information on the changes in orientation and direction of the vehicle body, the controller 30 controls the steering actuator 40, the speed change means 44 and the like such that the vehicle travels along a predetermined travel path R.

The autonomous travel work vehicle 1 is also provided with an obstacle sensor 41 that is connected to the controller 30 to avoid contact with an obstacle. For example, the obstacle sensor 41 may be constituted with an ultrasound sensor connected to the controller 30, and may be located in front, side, and rear parts of the vehicle so as to detect whether or not there is an obstacle in front, on the sides, or at the back of the vehicle. When the obstacle comes into a predetermined distance range, the vehicle is controlled to stop.

A camera 42 connected to the controller 30 is also mounted on the autonomous travel work vehicle 1 to take images of the surroundings of the vehicle body. Video captured by the camera 42 is shown on the display 113 that may be equipped in the accompanying travel work vehicle 100, or in the remote controller 112 carried by an operator. The operator can check if there is an obstacle from the image showing the front of the vehicle, or check the operating condition of the implement from the image showing the implement, finished condition after the operation, or the positional relationship or the like with the accompanying travel work vehicle 100. The positional relationship between the autonomous travel work vehicle 1 and the accompanying travel work vehicle 100 can be determined from images taken by the camera 42, or from the positional information obtained by the GPS equipped in the remote controller 112. If the display 113 has a small display screen, then the images may be displayed on another larger display, or the screen may be split into several parts to display several images simultaneously. Alternatively, camera footage may be displayed constantly or selectively on another dedicated display, or on the display means 49 provided in the autonomous travel work vehicle 1.

The remote controller 112 is provided for setting a travel path R of the autonomous travel work vehicle 1, controlling the autonomous travel work vehicle 1 remotely, monitoring the traveling condition of the autonomous travel work vehicle 1 or operating condition of the implement, or storing operation data.

The accompanying travel work vehicle 100, which will be the manned vehicle, is driven and controlled by an operator who is on board, with the remote controller 112 being mounted on the accompanying travel work vehicle 100 so that the operator can control the autonomous travel work vehicle 1. The accompanying autonomous travel work vehicle 100 is basically configured to be the same as the autonomous travel work vehicle 1 and therefore it will not be described in detail. In another possible configuration, the moving receiver 33 for the GPS and the moving GPS antenna 34 may be provided in the accompanying travel work vehicle 100 or the remote controller 112.

The remote controller 112 is removably attached to a control unit on the dashboard, or on the pillar or the ceiling of the cabin in the accompanying travel work vehicle 100 and in the autonomous travel work vehicle 1. The remote controller 112 can thus be operated as it is attached on the dashboard of the accompanying travel work vehicle 100, or brought out of the accompanying travel work vehicle 100 and operated, or can be operated as attached on the dashboard of the autonomous travel work vehicle 1. An attachment unit (not shown in FIG.) for the remote controller 112 is provided in the accompanying travel work vehicle 100 and/or the autonomous travel work vehicle 1. The remote controller 112 may be configured with a notebook PC or a tablet PC, for example. In this embodiment, it is configured with a tablet PC.

The remote controller 112 and the autonomous travel work vehicle 1 are configured to be able to communicate with each other wirelessly, i.e., the autonomous travel work vehicle 1 and the remote controller 112 are provided with transceivers 110 and 111, respectively, for communications. The transceiver 111 is integrated in the remote controller 112. The communication means is for example a wireless LAN such as WiFi that enables mutual communications. Measures are taken for avoiding jamming (including virus infection) and interference during communications between the autonomous travel work vehicle 1 and the remote controller 112. For example, a unique protocol or language may be used.

The remote controller 112 has the display 113 on the housing surface, which is a touchscreen control screen that allows for control through touching the screen, and includes the transceiver 111, a CPU, a memory, a battery, a camera, a GPS (satellite positioning device) and the like inside the housing. The display 113 can present, for an operator to monitor, images of the surroundings taken by the camera 42, conditions of the autonomous travel work vehicle 1, operation conditions, GPS (positioning) information, communication statuses between the remote controller 112 and the autonomous travel work vehicle 1 (e.g., good/no good, or radio wave intensity or communication rate), control screens, positional relationship between the autonomous travel work vehicle 1 and the accompanying travel work vehicle 100, and so on.

Conditions of the autonomous travel work vehicle 1 include operation statuses, traveling statuses, engine statuses, implement statuses, and so on. Traveling statuses include gear positions, speed, remaining amount of fuel, battery voltage, etc. Engine statuses include engine rpm, load factor, etc. Implement statuses include the type of implement, PTO rpm, implement's height, etc. These are all indicated as figures or in the form of level meters on the display 113.

The operation statuses include operation routes (target route or travel path R), operation process steps, the current location, the distance to headlands calculated from the process steps, the remaining section of the route, the number of process steps, the elapsed time of the operation, the remaining time of the operation, and so on. The operation route of the accompanying travel work vehicle 100 can also be indicated on the display 113. Worked sections in the preset travel path R for the autonomous travel work vehicle 1 and the accompanying travel work vehicle 100 are filled in so that the remaining sections of the route are easily distinguishable from the entire route. Alternatively, unworked sections and worked sections of the route may be indicated with different colors. Alternatively, the autonomous travel work vehicle 1 and the accompanying travel work vehicle 100 may be shown as animated images on the operation route to indicate their current operating positions. Moreover, the direction of the next process step from the current location is indicated with an arrow so that the movement such as turning for the next process step from the current position can be easily recognizable.

GPS (positioning) information includes longitudes and latitudes that represent the actual position of the autonomous travel work vehicle 1, number of captured satellites, radio wave reception intensity, and so on.

The display 113 of the remote controller 112 presents images of the surroundings taken by the camera 42 as well as the condition of the autonomous travel work vehicle 1 and the predetermined travel path R, and so on, but cannot show multiple pieces of information at one time. Therefore, the screen may be made larger and split, or another display may be provided for the camera, so that the monitor screen, the control screen, the travel path R, and the video shooting screen may be displayed simultaneously on the display 113 and other display(s), switched over from one another, or scrolled as the case may be, depending on the needs. The operator can thus easily view the screen the operator wishes to see.

The autonomous travel work vehicle 1 is remotely controllable by means of the remote controller 112. For example, the display 113 can show switches, adjust bars, and the like to allow for control through touching of these such as emergency stop, temporary stop, restart, speed change, and engine rpm change of the autonomous travel work vehicle 1; moving up and down the implement, and connecting and disconnecting the PTO clutch. Namely, the accelerator pedal actuator, the speed change means 44, and the PTO switch 45 are controlled from the remote controller 112 via the transceiver 111, the transceiver 110, and the controller 30, to allow the operator to readily control the autonomous travel work vehicle 1 remotely.

As described above, the autonomous travel work vehicle 1 includes the moving receiver 33 having a position calculator that determines the position of the vehicle body of the autonomous travel work vehicle 1 with the use of a satellite positioning system, the steering actuator 40 that activates the steering system, the engine controller 60 that is the engine rpm controller, the speed change means 44, and the controller 30 that controls all these. The parallel travel work system allows the autonomous travel work vehicle 1 to run autonomously along a preset travel path R stored in the controller 30, and enables operation of the autonomous travel work vehicle 1 through the remote controller 112 mounted on the accompanying travel work vehicle 100 that accompanies and operates with the autonomous travel work vehicle 1. The remote controller 112 is portable, as well as removably attachable to the accompanying travel work vehicle 100 and/or the autonomous travel work vehicle 1, so that, during the parallel travel work, an operation can be carried out with the remote controller 112 attached to the accompanying travel work vehicle 100, wherein the autonomous travel work vehicle 1 alone can perform the operation, or, in the event of a trouble on the autonomous travel work vehicle 1, the operator can remove the remote controller 112 and get on the autonomous travel work vehicle 1, or can control or check the autonomous travel work vehicle 1 near the vehicle or in a position where the operator has a good view of the vehicle. The operability is thus improved and the operator can deal with troubles easily.

Since the remote controller 112 has the display 113 for showing the traveling conditions of the autonomous travel work vehicle 1, conditions of the engine 3, conditions of the implement, and the positional relationship between the autonomous travel work vehicle 1 and the accompanying travel work vehicle 100, the operator can visually understand the condition of the autonomous travel work vehicle 1 easily, so that the operator can quickly deal with any abnormality occurring in the autonomous travel work vehicle 1. Also, during the operation where the operator is on the accompanying travel work vehicle 100, the operator can readily determine whether or not the accompanying travel work vehicle 100 is too close to or too far away from the autonomous travel work vehicle 1, or misaligned relative to the autonomous travel work vehicle 1.

The display 113 shows the target travel path (preset travel path) R to be described later of the autonomous travel work vehicle 1, the current location, the distance to headlands, the operation time, the operation time until completion, and the operation route of the accompanying travel work vehicle 100, which allows easy recognition of traveling conditions and operation procedure during the operation, and facilitates creation of work plans.

The display shows GPS (positioning) information, so that the status of signal reception from satellites can be known, and measures can be taken easily when signals from GPS satellites are disrupted.

The autonomous travel work vehicle 1 is equipped with the camera 42 for taking images of the surroundings of the vehicle, and the video captured by the camera 42 can be shown on the display 113. Thus the situation surrounding the autonomous travel work vehicle 1 can be readily recognized from a distance and measures can be taken easily when there is an obstacle or the like.

Figure 12A:
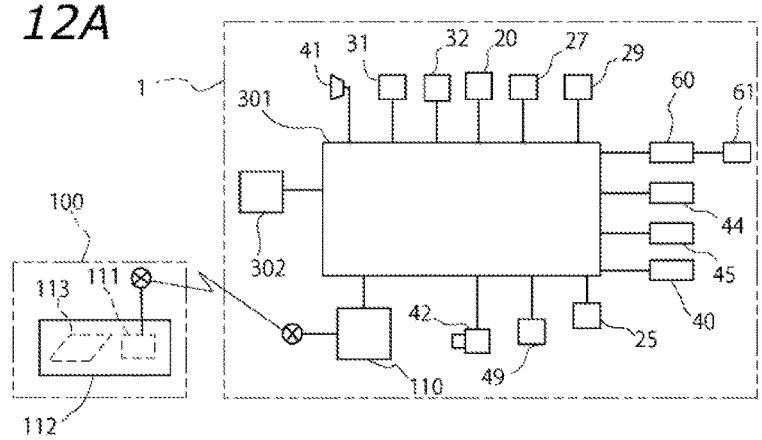
FIG. 12A, 12B, 12C are a control block diagram according to another embodiment.
Figure 12B:
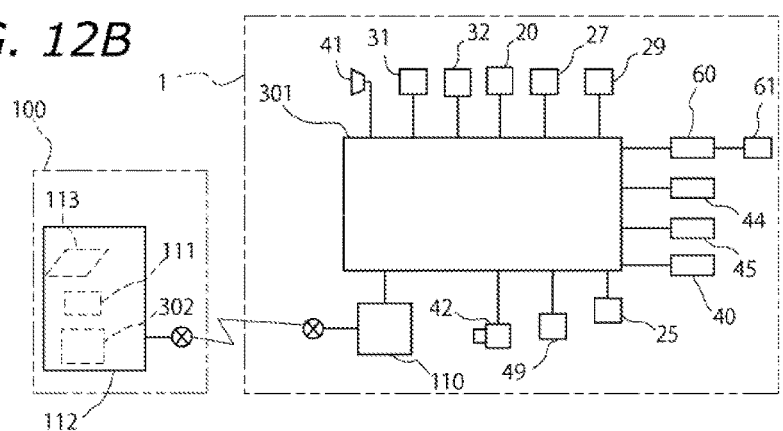
Figure 12C:
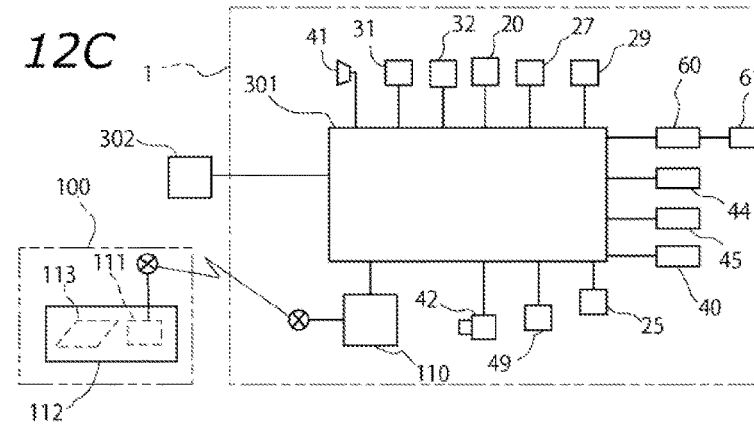

Next, how a target travel path R of the autonomous travel work vehicle 1 is created will be described. The target travel path R, once created, is referred to as the preset travel path R. The travel path R is stored in a memory 30a of the controller 30. The controller 30 can control the traveling and operation of the autonomous travel work vehicle 1 as well as calculate and store the travel path R all alone, but may alternatively be configured to perform the control of actions (traveling and operation) of the autonomous travel work vehicle 1 in a first controller 301 and to perform control of autonomous traveling (setting of the travel path R and determination of a condition for starting or interrupting the operation) and storage in a second controller 302. In this case, the first controller 301 and the second controller 302 may be disposed at different suitable locations on the autonomous travel work vehicle 1 as shown in FIG. 12A, or, the first controller 301 may be provided on the autonomous travel work vehicle 1 while the second controller 302 may be disposed in the remote controller 112 (the second controller 302 may be integrated in the controller of the remote controller 112) as shown in FIG. 12B, or, the first controller 301 may be provided on the autonomous travel work vehicle 1 while the second controller 302 may be disposed outside the autonomous travel work vehicle 1 as shown in FIG. 12C. The second controller 302 is configured as a unit and able to communicate externally with the first controller 301 via a connector (bus) or the like.

The target travel path R is created in accordance with an operation mode, Operation modes include a single operation wherein the autonomous travel work vehicle 1 operates alone, a parallel travel work wherein the autonomous travel work vehicle 1 and the accompanying travel work vehicle 100 operate together, and a double harvest operation by an autonomous combine harvester and the accompanying travel work vehicle. This embodiment describes how to create a travel path for a parallel travel work by the autonomous travel work vehicle 1 and the accompanying travel work vehicle 100. Parallel travel work includes a side-by-side cooperative operation shown in FIG. 3 and a series cooperative operation shown in FIG. 4. The parallel travel work by the autonomous travel work vehicle 1 and the accompanying travel work vehicle 100 enables reduction in operation time. Since this operation can be performed by adding an autonomous travel work vehicle 1 to a previously owned accompanying travel work vehicle 100, the cost can be kept low because there is no need to buy two new autonomous travel work vehicles 1.

Figure 3:
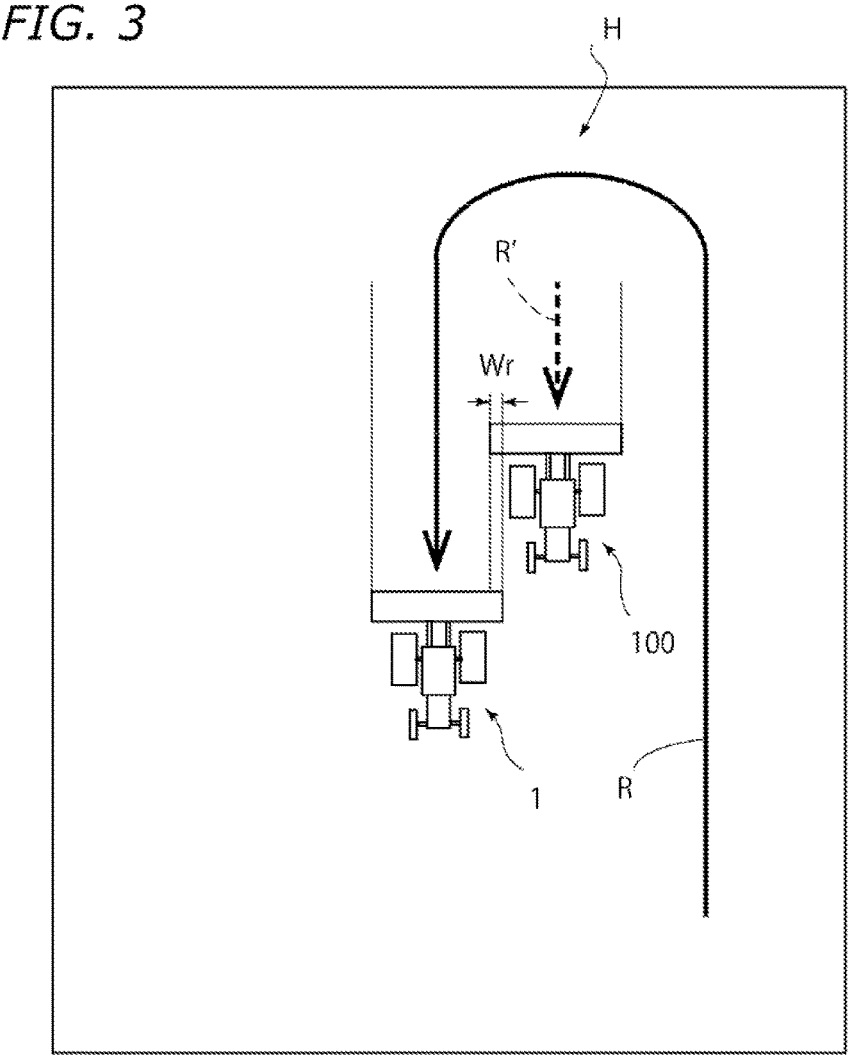
FIG. 3 is a diagram illustrating a status of a side-by-side cooperative operation.
Figure 4:
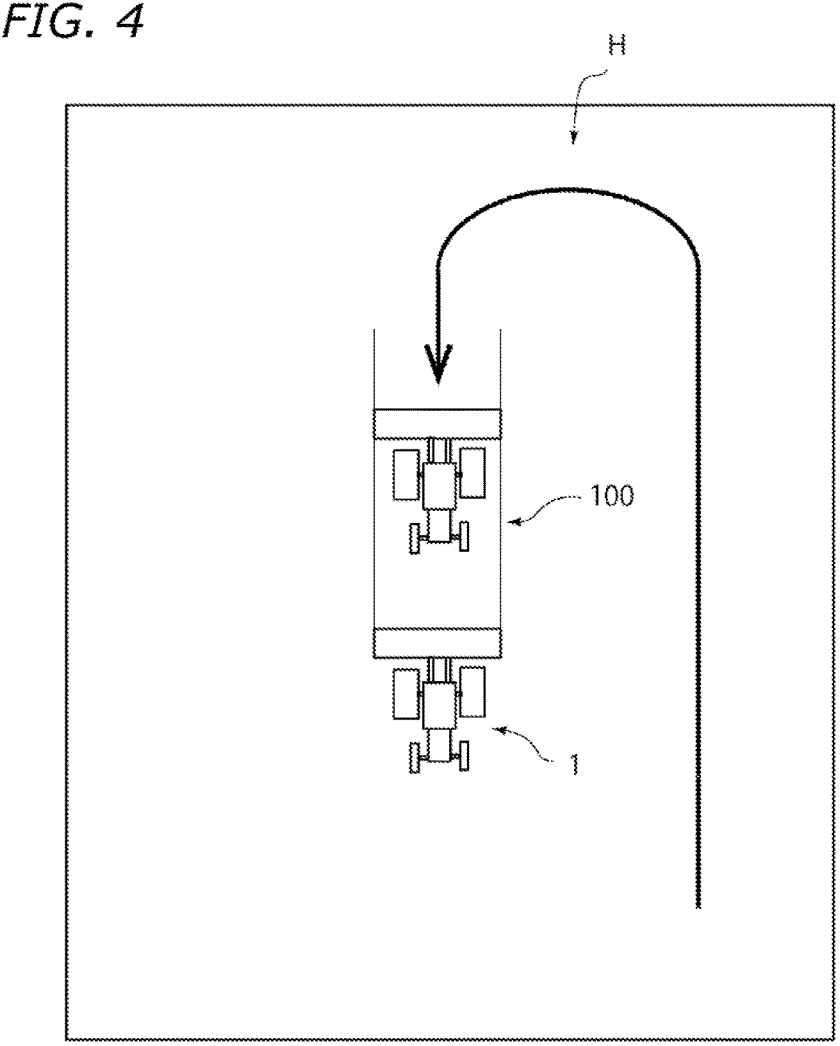
FIG. 4 is a diagram illustrating a series overlapping operation.

More specifically, in the side-by-side cooperative operation shown in FIG. 3, the accompanying travel work vehicle 100 travels along the autonomous travel work vehicle 1 diagonally behind it such that their work areas overlap partly (which is not necessary if the accompanying travel work vehicle 100 carries a trencher or the like as the implement) so that one person can do the work for a width of about twice larger than that of the implement and thereby time reduction can be achieved. In the series overlapping operation shown in FIG. 4, the autonomous travel work vehicle 1 and the accompanying travel work vehicle 100 carrying the same implement run in tandem to perform split processes of one operation, e.g., the first vehicle performing primary tillage and the second vehicle performing secondary tillage. Alternatively, in the series cooperative operation, the autonomous travel work vehicle 1 and the accompanying travel work vehicle 100 running in tandem may carry different implements and perform two or more split processes one after another such that the first vehicle cultivates (plows) and the second vehicle fertilizes or seeds.

How to create a travel path in the automatic operation system will be described, wherein an operation is carried out by the autonomously-traveling autonomous travel work vehicle 1 in the side-by-side cooperative operation. The setting operation is performed on the remote controller 112 here, but it can be done via the display means 49 on the autonomous travel work vehicle 1, too.

Figure 5:
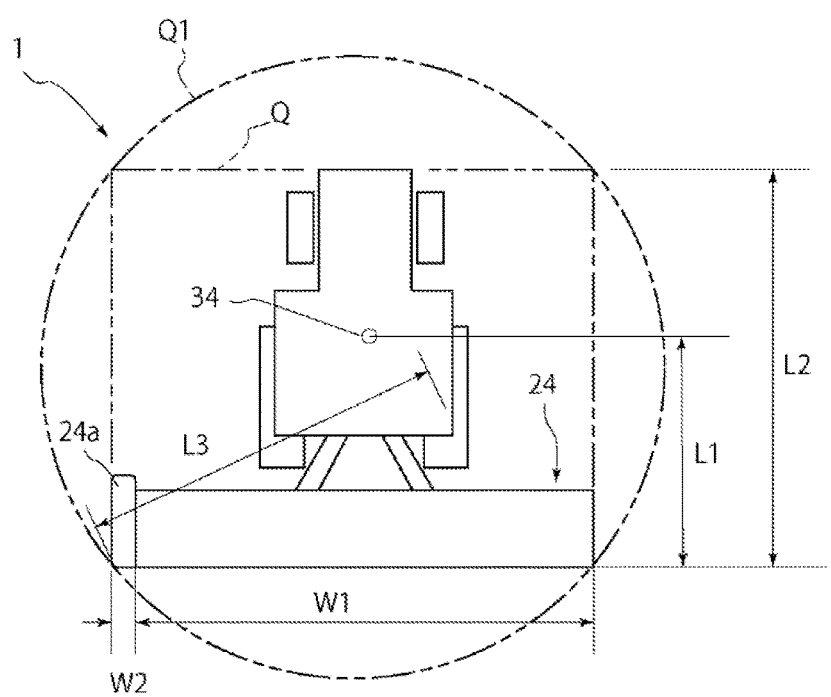
FIG. 5 is a diagram showing reference lengths for the autonomous travel work vehicle.
Figure 6:
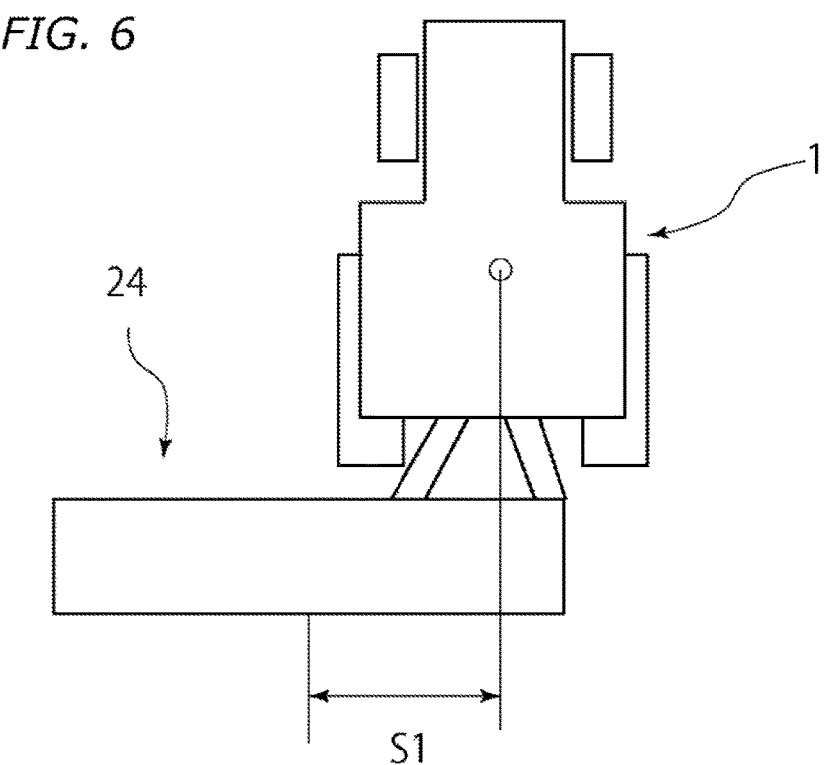
FIG. 6 is a diagram showing an amount of eccentricity when an implement is attached eccentrically to the autonomous travel work vehicle.

Reference lengths for tillage operation are preliminarily input to the memory 30a of the controller 30. The input of the reference lengths involves acquiring, from the specifications of the vehicle, an operation width W1 of the implement attached to the tractor, a distance L1 from the GPS antenna 34 mounted on the vehicle to the end of the implement, an entire length L2 of the vehicle body (or minimum turning radius L3) as shown in FIG. 5, and if the implement is arranged eccentrically, the amount of eccentricity S1 from the left-to-right center as shown in FIG. 6, and storing these parameters in the memory 30*a* of the controller 30. If the implement is a rotary tiller 24, whether it is side-driven or center-driven is specified, and if it is a side-driven tiller, the position of a chain case 24*a* and a width W2 are stored in the memory 30*a*, too. The area occupied by the entire length L2 of the vehicle body and the width of the implement (W1+W2) is defined as a maximum occupied area Q ((L2×(W1+W2)) taken up by the autonomous travel work vehicle 1 and the implement (rotary tiller 24) during the traveling, and stored in the memory 30*a*. When a front implement is attached, the entire length L2 will be the distance from the front end of the front implement to the rear end of the vehicle body. When a mid-implement is attached instead of the rotary tiller 24, (W1+W2) will be W1 if the mid implement has a larger width than the vehicle width (outer width between left and right rear wheels). The maximum occupied area Q is not limited to a rectangle but may be a circumcircle Q1 of this rectangle. Interference with furrows or the like during turning will be more readily recognizable if the area is a circumcircle Q1.

The reference lengths of the accompanying travel work vehicle 100 are likewise input to the memory 30*a* of the controller 30 or to the remote controller 112.

Figure 7:
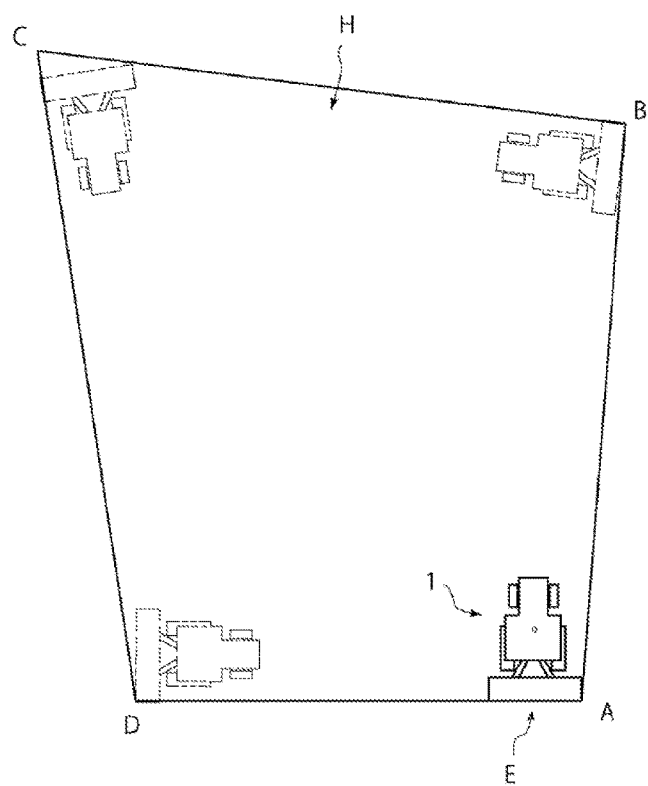
FIG. 7 is a diagram showing a process of acquiring agricultural field data.

Next, to set a position of an agricultural field, a work area, and a travel path R for the operation, a positioning process is carried out wherein the autonomous travel work vehicle 1 is positioned at four corners of the agricultural field (A, B, C, D, or inflection points). Namely, as shown in FIG. 7, positioning is performed at an entrance/exit E of an agricultural field H, and the longitude and the latitude of the point are stored as entrance/exit position data in the memory 30*a* of the controller 30. Setting an entrance/exit E allows easy setting of an operation start position X and an operation end position of the travel path R. While traveling along the outer circumference of the agricultural field and making measurements to create the travel path R, positioning may be done sometimes using correction signals from a stationary base station, and sometimes using correction signals from a simple base station. Therefore, which base station was used for the positioning should be made identifiable, so that it can be recognized easily when it is felt there is something wrong during creation of the travel path R.

The autonomous travel work vehicle 1 enters from the entrance/exit E and moves to one corner A nearest to the entrance. There it is positioned to be parallel to short sides or long sides (hereinafter, furrows) of the agricultural field, and the position is determined and stored as first corner data (latitude and longitude). The unmanned tractor is then moved to a next corner B and turned about 90 degrees so that it is parallel to the furrows. The position is then determined and stored as second corner data. Similarly, the tractor is moved to a next corner C, third corner data is acquired and stored, moved to a next corner D, and fourth corner data is acquired and stored. Thus, starting from one corner A, corners B, C, and D are successively connected unicursally with straight lines to determine the shape of the agricultural field, which is acquired as the agricultural field data. When the agricultural field has an odd-shape, position data of corners other than the four corners and inflection points is acquired to determine the agricultural field data. For example, if it is triangular, or pentagonal, position data of three, or five, corners is acquired and stored. Since "inflection points" are a broader concept than "corners", agricultural field data can be acquired by successively determining the positions and acquiring position data of inflection points one after another around the agricultural field. The travel path R may be created only in a region inside the outer circumference of the agricultural field according to the data obtained by traveling along the outermost circumference. A travel path R that goes over the region is regarded as an error and cannot be created. When straight lines connecting corners intersect each other, the corner data is not recognized as the agricultural field data. This is because such an agricultural field cannot exist, and most likely a corner or inflection point has been omitted. In creating agricultural field data, usage of map data published on the Internet or by map makers or the like to acquire agricultural field data is prohibited, while usage of only the position data obtained on site as described above is allowed. This way, the work vehicle is prevented from going out of the agricultural field in actual operation due to possible errors.

Moreover, there may be water inlets or drain outlets around the agricultural field, boundary piles or stones may be arranged, or trees may have grown into the agricultural field. These will be in the way when the vehicle runs straight, and so they may be set as obstacles by determining their positions. These objects are set as obstacles during creation of the agricultural field data. When obstacles are set, the travel path R is determined such that these objects will be avoided during autonomous traveling.

Figure 8:
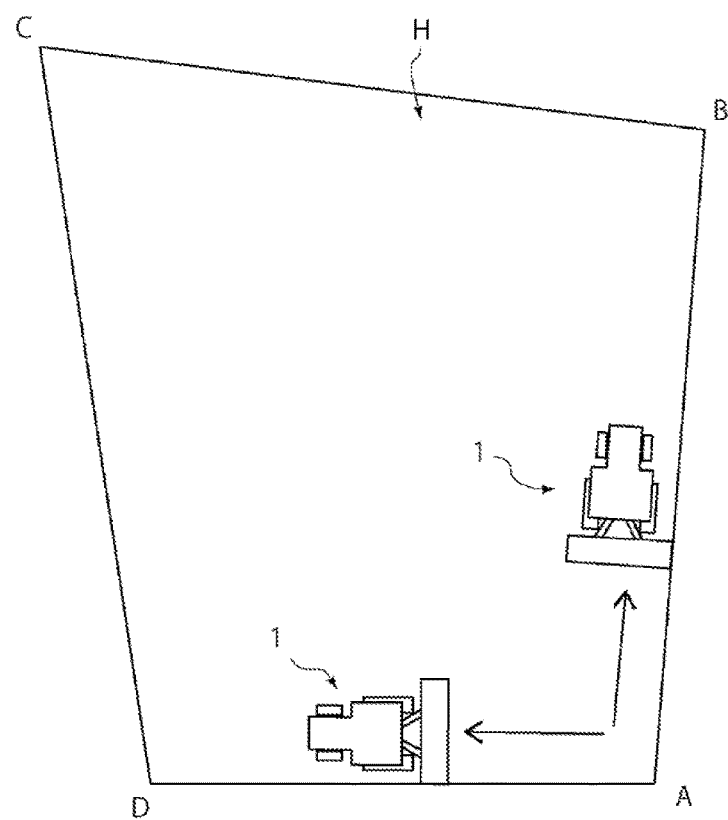
FIG. 8 is a diagram showing directions of a reference route.

A step of selecting a direction for starting reference traveling follows. The direction for starting reference traveling to be selected is a moving direction from a start position to an end position in a circular or reciprocatory operation, and a route from the operation end position to the exit (operating direction outside the work area HA). More specifically, as shown in FIG. 8, the direction for starting reference traveling is set by selecting whether to start and end the operation clockwise or counterclockwise. This selection can be made easily by touching an arrow or other marks that may be shown on the display 113.

Figure 9:
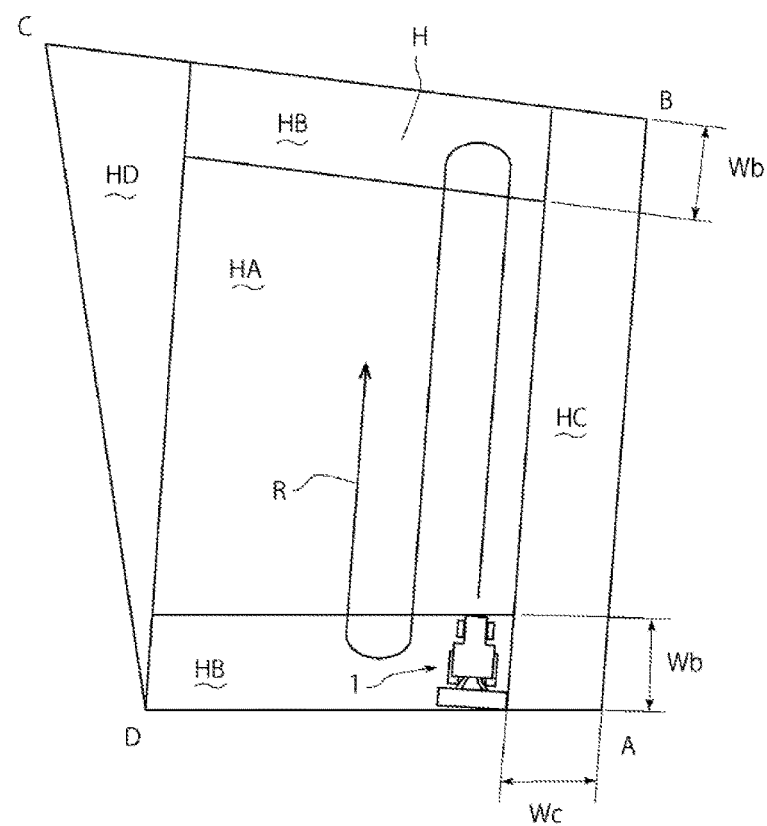
FIG. 9 is a diagram showing a work area and headlands in an agricultural field.

The work area HA thus obtained from the agricultural field data is approximately rectangular as shown in FIG. 9; and this work area HA is shown on the display 113 of the remote controller 112. In this work area HA, headlands HB are determined on both front and back of the operating direction in which the autonomous travel work vehicle 1 moves. Width Wb of the headlands HB is determined from a tilling width W1 when the implement is the rotary tiller 24. For example, a multiplication by an integer of the input tilling width may be selected. Note, the width Wb of the headlands HB here is the length in a direction parallel to the moving direction (longitudinal direction) of the autonomous travel work vehicle 1 operating in the work area HA. Since the vehicle has to be turned around without making a three-point turn with some margin for slips and the like, the headland width Wb must be larger than the minimum turning radius. Therefore, the minimum turning radius of the autonomous travel work vehicle 1 with an implement (rotary tiller 24 in this embodiment) attached thereto is preliminarily stored in the memory 30*a*, so that values smaller than this minimum turning radius cannot be input during the setting. The turning radius set here may be the turning radius when there is no accelerated turning or auto-steering function.

When the accompanying travel work vehicle 100 is larger than the autonomous travel work vehicle 1, or when the implement attached to the accompanying travel work vehicle 100 is larger than the implement attached to the autonomous travel work vehicle 1, the reference lengths of the accompanying travel work vehicle 100 are adopted when setting the width Wb of the headlands HB.

Any suitable value can also be input as the headland width Wb when other types of implements are attached, to allow the entire length of the implement and furrow width and the like to be taken into consideration.

Turning directions in the headlands HB can also be set, since there are cases when an operation is to be performed back and forth in the headlands or in spirals around the work area including the headlands.

Also, width We along one edge HC on the starting side (distance from the furrow) can be set to any length since there are cases when an additional operation is required for processing furrows that may exist around the agricultural field.

A step of setting an overlapping amount (overlapping width) follows. The overlapping amount Wr (FIG. 3) refers to an overlapping width of a forward path and a return path in a reciprocatory operation with an implement (e.g., rotary tiller 24), or an overlapping operation width of left and right rotary tillers in the side-by-side cooperative operation by the autonomous travel work vehicle 1 and the accompanying travel work vehicle 100. The overlapping amount Wr is set to a suitable length so that no area is left unfilled even when there are slopes, irregularities, and the like. In the series overlapping operation, when there is set an overlapping amount Wr, the implements may collide each other when they pass by each other after one has turned around in the headland. Or, the autonomous travel work vehicle 1 may come to a halt when the obstacle sensor 41 detects the other vehicle as an obstacle. To avoid these situations, the accompanying travel work vehicle 100 goes ahead one row or more to prevent collision. Alternatively, certain "pass-by control" is executed as the vehicles approach a headland so as to avoid collision between the implements. The "pass-by control" is, for example, raising one implement while lowering the other implement when they pass by each other. In operations with implements that do not need overlapping such as a transplanter for one center furrow, a seeder, a trencher and the like, furrow spacing may be set suitably, and there is no need for one vehicle to go ahead or to perform the "pass-by control". A suitable one of these may be selected in accordance with the operation mode.

The agricultural field data also includes an operation end position that can be set or selected. For example, once the travel path R has been set, when the operation end position is located on the side opposite to the entrance/exit E, or when a remaining area HD of the agricultural field H outside the rectangular work area HA is distanced from the entrance/exit E, priority is given to the operation end position, so that overlapping work is avoided as much as possible to cause minimal damage to the agricultural field when the operation is complete. In this case, the operation start position X is determined by tracing the operation travel path R reversely from the operation end position. Therefore, the operation start position X could be located away from the entrance/exit E. The operation start position X or the operation end position may also be set anywhere the operator likes. Therefore, the operation start direction or operation end direction may also be changed, by setting a certain idle running process where no operation is carried out.

Once setting is done by inputting values and selecting options described above, the controller 30 automatically generates a travel path R for a reciprocatory operation to be repeated in the work area HA wherein the vehicle runs straight and makes U-turns in the headlands HB to reverse the direction. An operation route R' (FIG. 3) for the accompanying travel work vehicle 100 is also generated at the same time.

When the step of creating a travel path R is complete, next comes a step of setting operation conditions. Operation conditions include, for example, a speed (gear shift position), an engine rpm, and a PTO rpm (PTO gear shift position) during operation, and a speed, an engine rpm and the like during turning. Operation conditions are set at each location in the travel path R so as to generate operation process steps.

Setting screens are shown on the display 113 one after another for allowing input and selection of setting values on the display 113 to eliminate error or omission, which makes it easy for the operator to set or input values.

Once the setting is done and a travel path R and operation process steps along the travel path R are generated, the operator drives and moves the autonomous travel work vehicle 1 to the operation start position X, and places the accompanying travel work vehicle 100 nearby, to start the operation. The operator then controls the remote controller 112 to start the operation.

A prerequisite to starting an operation is that start conditions of the autonomous travel work vehicle 1 are met.

The operation start conditions are stored in the controller 30 of the autonomous travel work vehicle 1, and when an operation starter of the remote controller 112 equipped in the accompanying travel work vehicle 100 is turned on, the controller 30 determines whether or not the predetermined operation start conditions are met. The operation start conditions will be described later. The operation starter may be configured as a start button or a start switch and may be provided in the autonomous travel work vehicle 1.

The accompanying travel work vehicle 100 that operates while accompanying the autonomous travel work vehicle 1 will be described.

The accompanying autonomous travel work vehicle 100 is manually driven by the onboard operator. The operator drives the vehicle behind or beside the autonomous travel work vehicle 1 that is unmanned and runs along the preset route (travel path R). Thus, while traveling the accompanying autonomous travel work vehicle 100, the operator monitors the autonomous travel work vehicle 1 and performs the operation, and controls the autonomous travel work vehicle 1 as required through the remote controller 112.

For the remote control of the autonomous travel work vehicle 1 through the remote controller 112, the controller 30 is connected to the steering actuator 40, a brake actuator, the accelerator pedal actuator, the speed changer means 44, the PTO switch 45, a clutch actuator, the elevator actuator 25, and so on.

To monitor the traveling or operating conditions of the autonomous travel work vehicle 1, the traveling speed of the autonomous travel work vehicle 1 is detected by the speed sensor 27, the engine rpm is detected by the rpm sensor 61, and detected values are shown on each of the display means 49 and on the display 113 of the remote controller 112. A video taken by the camera 42 is transmitted to the remote controller 112 and shown on the display 113 to allow for viewing of the front of the vehicle and conditions of the implements or the agricultural field.

Operation data is stored in the memory of the remote controller 112. For example, the position of the agricultural field or the date of operation, positions of worked sections of the travel path R set for that agricultural field, or types of manure or an amount of manure per unit area in a manure spreading operation may be stored as operation data.

As described above, there is provided a method for setting a travel path R of an autonomous travel work vehicle 1 for the autonomous travel work vehicle to run and operate autonomously by determining positions of the autonomous travel work vehicle 1 with the use of a satellite positioning system so as to drive the autonomous travel work vehicle 1 and carry out an agricultural field operation from one end (operation start position X) to another end (operation end position) of the agricultural field H. The method includes a step of inputting a front-to-back length of a vehicle body, a step of inputting a width of an implement, a step of inputting an overlapping amount of implements in a width direction, a step of positioning a work vehicle at inflection points successively along an outer circumference of the agricultural field and determining positions of the vehicle body with the use of the satellite positioning system at every position, a step of setting a work area inside the agricultural field, a step of setting an entrance/exit E, a step of setting an operation start position X and an operation end position, a step of setting a direction for starting reference traveling, a step of setting headlands HB on both ends of the work area, and a step of setting a travel path R within the agricultural field. With this method, a travel path R can be easily created by inputting lengths that are readily available from specifications of the work vehicle, and by determining the positions of the vehicle moved within the agricultural field that can be easily achieved.

Since the width Wb of the headlands HB is a multiplication by an integer of the implement width (W1+W2), the headland setting can be easily done. Since the width Wb of the headlands HB is set larger than the minimum turning radius L3 of the autonomous travel work vehicle 1 having the implement attached thereto, the vehicle can turn around at the headland without having to make a three-point turn, so that operation efficiency will not be lowered.

Figure 13:
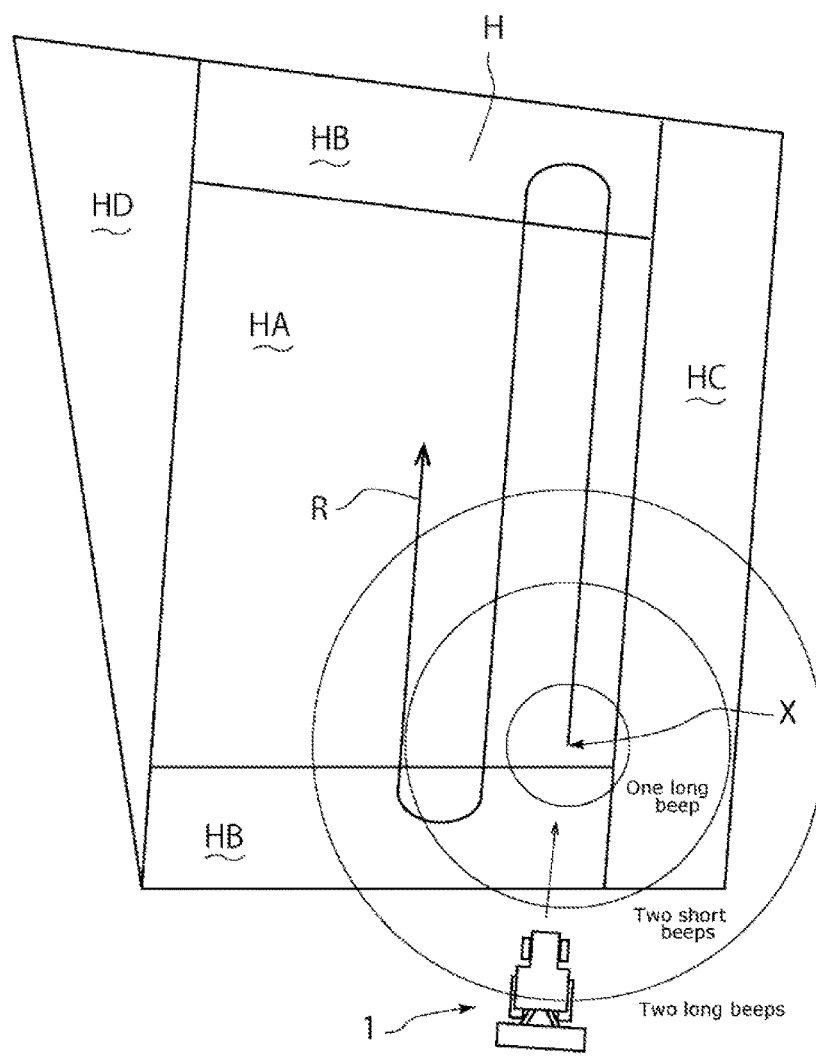
FIG. 13 is a diagram showing an autonomous travel work vehicle approaching an operation start position.

After the operation travel path R is thus created, the operation is started. To start the operation, the operator drives and moves the autonomous travel work vehicle 1 to the operation start position. While the current location determined by the GPS positioning is displayed on the map, it is difficult to move the vehicle accurately to the operation start position X. Therefore, as shown in FIG. 13, while moving the autonomous travel work vehicle 1 to the operation start position X, audio guidance can be given or visual guidance can be shown on the display means. For example, to announce that the operation start position X is approaching by stepwise changes in sound, the sound level may be lowered, or the interval of intermittent sound may be made long when the operation start position X is far away, while the sound may be made louder, or the interval of the sound may be made shorter as the operation start position X approaches. When the vehicle enters the zone of the operation start position X, the sound quality may be changed, or the sound may be made continuous. Not only distance but also direction can be guided with sound. To give guidance through display means (display 113) to the operation start position X, arrows or the like may be used.

Figure 10:
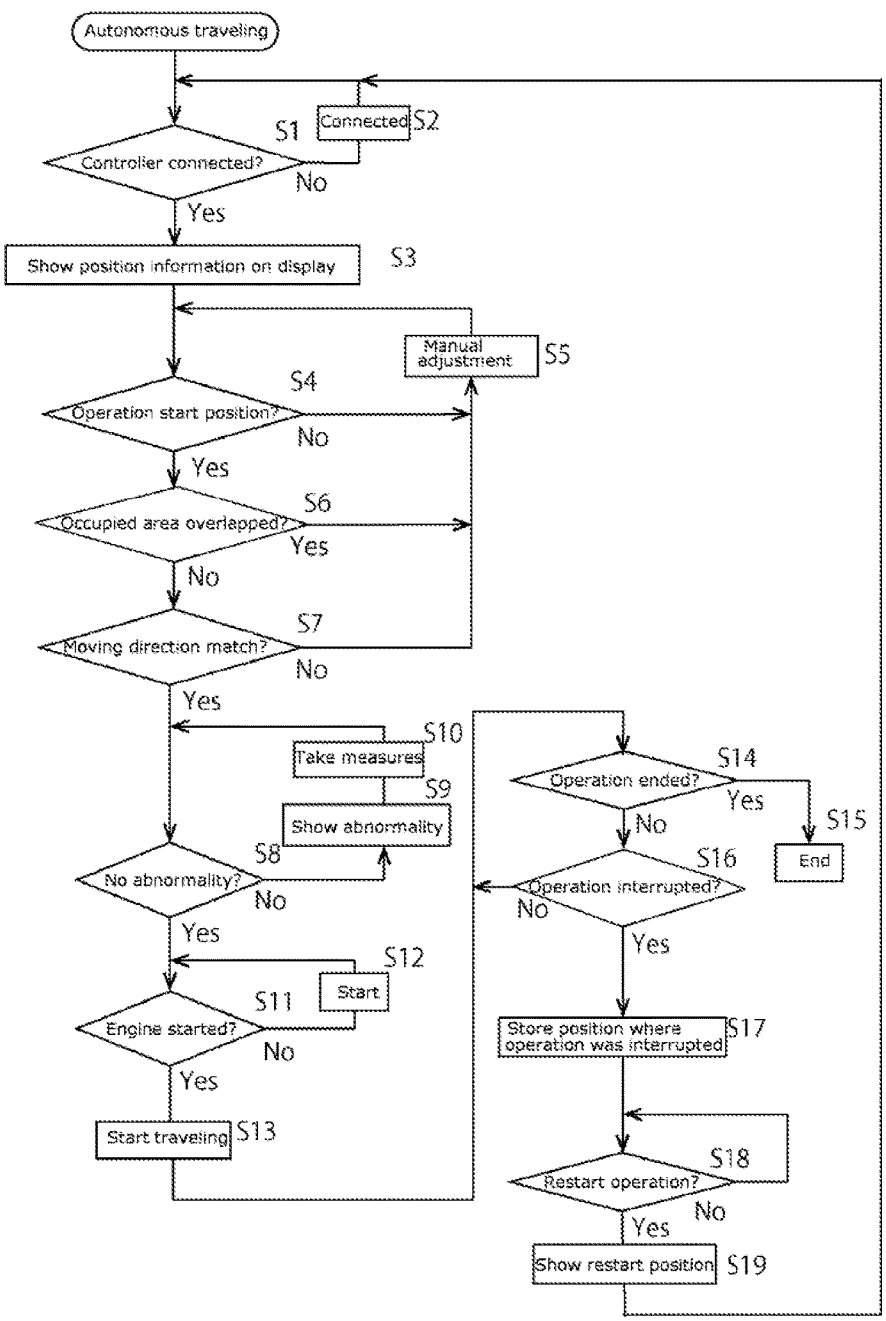
FIG. 10 is a flowchart showing control steps when starting autonomous traveling.

The controller 30 executes the following control. As shown in FIG. 10, the autonomous travel work vehicle 1 and the accompanying autonomous travel work vehicle 100 are each brought to the operation start position in the agricultural field, and the operator gets on the accompanying autonomous travel work vehicle 100 (the operator can also carry the remote controller 112 while accompanying the autonomous travel work vehicle 1) and sets the remote controller 112 to a standby mode. The controller 30 determines at this time whether or not the remote controller 112 of the accompanying autonomous travel work vehicle 100 is connected in a communicable manner to the controller 30 of the autonomous travel work vehicle 1 (whether there is any communication error) or not (S1). Namely, whether or not communication through the transceivers 110 and 111 is possible is determined to enable remote control and monitoring from the remote controller 112 during the operation. When there is no connection, the controller checks power supplies, wireless status and so on, and configures connection settings (S2). No connection means a communication error, which may be disconnection or communication jamming. If there is a communication error, the contents of that error are shown on the display 113. If there is connection, the operator operates the operation starter.

Upon this operation of the operation starter, the controller 30 determines the current location of the work vehicle (autonomous travel work vehicle 1) from the GPS signals, and indicates the current location, the operation start position, and position information such as the moving direction of the operation on the display 113 (S3). The current location, the operation start position, the moving direction of the operation, the agricultural field shape, and so on, are constantly (in other words, during a map display mode) shown on the display 113 unless it is switched to other screens. When the reference station used to determine the position is different from the reference station used to create the work area HA or the travel path R, permission to start the autonomous traveling is not given, since there is the possibility of misalignment due to the different references.

At this time, the controller determines whether or not the autonomous travel work vehicle 1 is located at the operation start position, i.e., whether or not it is within a preset range from the operation start position (S4). "Whether or not it is positioned within the preset range" means whether or not the current location of the autonomous travel work vehicle 1 determined by the positioning is within a preset range (preset distance) from the operation start position of the preset travel path R. In addition, the controller may further determine whether or not it is within a range where communication is not interrupted between the autonomous travel work vehicle 1 (transceiver 110) and the remote controller 112 (transceiver 111), or, whether or not it is within a range where the communication rate level of the communication between the autonomous travel work vehicle 1 (transceiver 110) and the remote controller 112 (transceiver 111) is at or above a preset value. Alternatively, since positioning is not possible if there are any errors in the GPS signals, the controller may further determine whether or not the GPS signal intensity is within a preset range. When the accompanying travel work vehicle 100 carries a GPS, the controller may also determine whether or not the accompanying travel work vehicle 100 is located at a standby position. The standby position is not the operation start position of the accompanying travel work vehicle 100 but near the autonomous travel work vehicle 1 where it can start operation without delay after the autonomous travel work vehicle 1 has started its operation.

When the controller determines that the autonomous travel work vehicle 1 is not positioned within a preset range, it does not permit the vehicle to start autonomous traveling. Therefore, the operator drives the autonomous travel work vehicle 1 to move it to the operation start position X (S5). The preset range may be, for example, a range in which the vehicle can come to the correct position by moving a few meters after starting the operation and easily correct its position, or a range in which it does not affect the operation being carried out by the accompanying travel work vehicle 100, so as to minimize unworked area. Whether or not the agricultural field is the previously specified agricultural field for the operation can also be determined at the same time, and if it is not the agricultural field where the operation is to be performed, the autonomous traveling is not started. The vehicle may also be controlled such that when it is located outside the preset range, it can start moving and the operation, but is stopped soon. This way, one can confirm that the traveling section and implement operate normally and know that there are other problems arising.

Next, it is determined whether or not the maximum occupied area Q of the autonomous travel work vehicle 1 is overlapping part of the land outside the agricultural field (S6). That is, even when the vehicle body of the autonomous travel work vehicle 1 is positioned inside the preset range (operation start position X or travel path R) in the agricultural field H, the rear end or the side edge of the implement (rotary tiller 24) may be positioned outside the agricultural field H. In this case the autonomous traveling is not started.

When the maximum occupied area Q of the autonomous travel work vehicle 1 is positioned inside the agricultural field, it is then determined whether or not the direction set as the moving direction of the autonomous travel work vehicle 1 is positioned within the preset range (by comparing the direction detected by the direction sensor 32 and the direction set as the moving direction) (S7). When it is not within the preset range, the start of autonomous traveling is not permitted, and the operator adjusts the moving direction of the autonomous travel work vehicle 1 (S5). The moving direction within the preset range may be set, for example, as within 20 degrees on the left and right from the center of the moving direction set on the travel path R, i.e., an area in which the vehicle direction can be corrected to the set direction within a few meters from the start of traveling.

Next, whether or not there is any abnormality in the autonomous travel work vehicle 1 is determined (S8). If there is an abnormality, the type of abnormality is indicated (S9). The operation is not started and the abnormality is resolved (S10). Abnormalities include, for example, an engine stop, a buildup in oil temperature or water temperature, a disconnection or short circuit in an electrical system, failure of the implement, a door of the autonomous travel work vehicle 1 not fully closed (detected by a sensor), or the remote controller 112 unattended by (distanced from) the operator. Whether or not the operator is paying attention to (away from) the remote controller 112 is determined through detection with a camera or a touch sensor provided to the remote controller 112.

If there is no abnormality, whether or not the engine 3 has been started is determined (S11). If it has not been started yet, the autonomous traveling is not started, and the operator gets on the autonomous travel work vehicle 1 to start it up (S12). If it has already been started, the autonomous traveling and operation are started (S13). At each step of determination of whether or not the starting condition is met, the display may be changed from one to another each time when the step is complete. When the work vehicle is an electric vehicle, determination is made whether or not the battery is in a state capable of supplying power to the electric motor.

During an autonomous traveling operation, whether or not the operation has ended is determined (S14). When the operation ends, the traveling of the autonomous travel work vehicle 1 is stopped and ended (S15). When it is not ended, whether or not the operation has been interrupted midway is determined (S16). Conditions for interruption will be described later. If conditions for interruption are not met, the autonomous traveling operation is continued. If the operation is interrupted, the position where interruption occurred is stored in the memory 30a (S17). Once interruption occurs, whether or not the operation can be restarted is determined (S18). If it is to be restarted, the position where interruption occurred is displayed as the restart position (S19), and the process goes back to step 1. The restart position after the interruption can be selected to a different operation start position from the position where interruption occurred. At the restart, it is also possible to control the autonomous travel work vehicle 1 to automatically move to the restart position when it has moved elsewhere for replenishment of fuel or repair.

As described above, when starting an operation with the autonomous travel work vehicle 1 upon a switch or the like being operated, the controller 30 controls the autonomous travel work vehicle 1 located at the operation start position such as not to allow it to start operation when the current location is away from the operation start position X of the preset travel path R by more than a predetermined range. This way, an increase in unworked area at the operation start position X is prevented, and even when there is some misalignment within the preset range, the vehicle can be quickly returned to the preset riving route R.

The controller 30 includes the first control unit 301 that controls traveling and operation of the autonomous travel work vehicle 1, and the second control unit 302 that calculates and stores the travel path R. The first control unit 301 is provided in the autonomous travel work vehicle 1, while the second control unit 302 is provided either in the autonomous travel work vehicle 1 or the remote controller 112. Thus, processing (control processing) is performed in parallel (distributed), so that the load is reduced and the control processing can be made faster. With the second control unit 302 provided in the remote controller 112, setting can be carried out away from the vehicle body, such as at home.

The controller 30 controls the vehicle not to start autonomous traveling if the moving direction is directed toward outside of the preset range at the operation start position X. Therefore, the vehicle is prevented from moving in an unintended direction, contacting furrows or other obstacles, or forming a largely curved operation track.

The controller 30 controls the vehicle not to start autonomous traveling if an abnormality arises in the autonomous travel work vehicle 1, so that the vehicle is prevented from starting operation with the abnormality and damaging the vehicle body, the engine, the implement and the like. The controller 30 of the autonomous travel work vehicle 1 controls the vehicle not to start autonomous traveling if it is not connected to the remote controller 112 via the transceivers 110 and 111 (when there is a communication error), so that the control via the remote controller 112 can be carried out reliably and the condition of the autonomous travel work vehicle 1 can be readily recognized.

When the operation is interrupted, the controller 30 stores the position where it was interrupted, sets this position as the operation restart position when the operation is restarted, and shows this position on the display means 49 or the display 113. Thus positioning, when starting the operation after an interruption, can be carried out easily, so that the operation is prevented from being disrupted.

During the operation with the autonomous travel work vehicle 1 and the accompanying autonomous travel work vehicle 100, the autonomous traveling is stopped to interrupt the operation when the following conditions are met.

Figure 11:
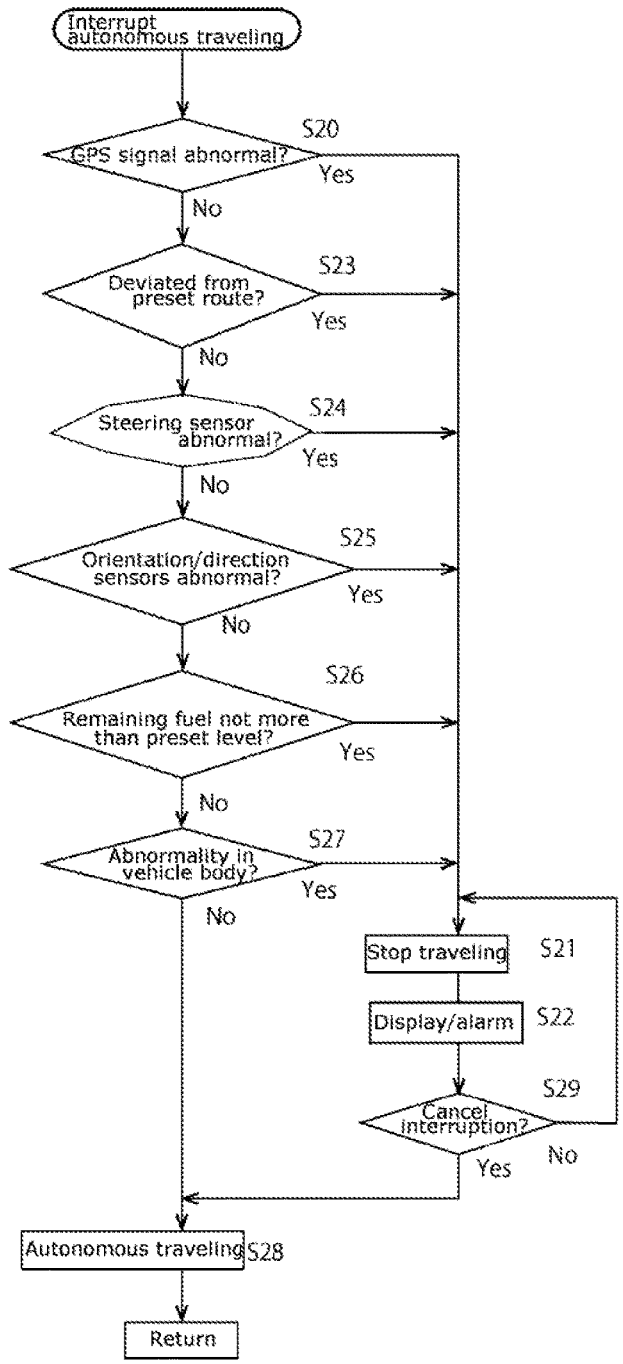
FIG. 11 is a flowchart showing control steps when interrupting the operation during autonomous traveling.

As shown in FIG. 11, during the parallel travel work by the autonomous travel work vehicle 1 and the accompanying autonomous travel work vehicle 100, the controller 30 determines whether or not the GPS signal is abnormal (S20). The controller 30 receives GPS signals from a plurality of GPS satellites 37, 37 . . . so as to determine the current location of the autonomous travel work vehicle 1. When the GPS signals reduce in level or are lost and show abnormal values, the controller can no longer determine the current location and keep the vehicle traveling along the preset route. Therefore, when the GPS signals assume abnormal values, the autonomous traveling is stopped (S21), and the operation is interrupted. "Abnormalities of GPS signals" include the following situations: The number of satellites associated with the global navigation satellite system (GLASS) from which signals are received is less than a predetermined number of satellites; the level of signals from the satellites is lower than a predetermined level; the waveform of the signal received from the satellite is different from a predetermined waveform; the signal changes to a frequency other than a predetermined frequency; the signal is interrupted; and the directions of a plurality of satellites from which signals are received are shifted to a predetermined direction. When any of these situations arises, the autonomous traveling is stopped. When stopping the traveling, the cause of the stop is shown on the display 113 of the remote controller 112 and on the display means 49 of the accompanying travel work vehicle 100, and an alarm is set off (S22).

The actual position (determined position) of the autonomous travel work vehicle 1 detected from the GPS and the preset travel path R are compared (S23), and when the actual position is deviated from the travel path R by more than a preset distance, the autonomous traveling is stopped (S21). At the same time, the autonomous travel work vehicle 1 can be controlled to stop traveling when the actual position of the accompanying travel work vehicle 100 compared to the preset travel path is deviated by more than a preset distance, or when the position of the autonomous travel work vehicle 1 is deviated relative to the accompanying travel work vehicle 100 by more than a preset distance. Namely, the vehicle is prevented from going off the preset travel path to leave the unworked part or from creating unnecessarily overlapped area. Also, the autonomous travel work vehicle 1 is prevented from going away by more than a preset range from the accompanying travel work vehicle 100 to make the signals from the remote controller 112 hard to reach, or to go off the monitoring range of the operator.

During the operation, the controller also determines whether or not the output from the steering sensor 20 that detects the steering direction of the steering handle 4 is within a normal range (S24). For example, to avoid sudden turning due to an abnormal detected value caused by a disconnection or short circuit, the traveling is stopped when an abnormal value is detected (S21).

The controller also determines whether or not the outputs from the gyro sensor 31 that detects the orientation and from the direction sensor 32 that detects the direction are within a normal range (S25). If the output is an abnormal value, the traveling is stopped (S21). The controller may determine whether or not there is any abnormality in the process of dead-reckoning. For example, in cases where an inertial navigation system is applied, it is determined whether or not there is any abnormality in sensor values associated with the inertial navigation such as an rpm sensor on an axle (running wheels).

The controller also determines whether or not the remaining amount of fuel is not more than a preset level (S26). When the remaining amount of fuel is not more than a preset level, the traveling is stopped (S21). The preset level can be set as desired. This way, there is no need to replenish fuel during the operation. The engine is prevented from stalling due to lack of fuel during the operation, and prevented from damage. Instead of determining the remaining amount of fuel, the amount of consumed fuel may be calculated through integration of the engine rpm, the load, the operating time or the like, to execute control to stop the operation when the integrated value exceeds a predetermined level. In this case, the amount of fed fuel or remaining amount is input in advance.

When other abnormalities arise in the vehicle body or elsewhere (S27), the vehicle is stopped to interrupt the operation (S21). Other abnormalities include: The engine not rotating normally; abnormal vibration in the vehicle body; the implement failing to operate; difference between the number of rotation of the axle and the moving distance exceeding a predetermined range due to a slip; an open door if the vehicle has a cabin; communication with the remote controller 112 failing; and the remote controller 112 being separated from the operator in an operator control mode when the operator is supposed to carry the remote controller 112. The operation is interrupted if any of these situations arises. Separation of the remote controller 112 from the operator may be detected, for example, when an impact acceleration of the remote controller 112 of more than a predetermined level is detected; or an abnormal orientation of the remote controller 112 (upside down, or inverted) is detected, or alternatively, where a camera is installed in the remote controller 112 to add a face recognition function, when the remote controller fails to recognize the operator for more than a predetermined period, or where a human sensor is provided, when the remote controller fails to detect the carrier. The traveling is stopped in any of these cases.

The autonomous traveling is continued if there is no interruption (S28). When the traveling is stopped (S21), the cause of the interruption is indicated and an alarm is set off (S22). The operator then stops the operation of the accompanying travel work vehicle 100 and carries out an operation to resolve the cause of the interruption. When the cause of the interruption is resolved (S29), the autonomous traveling is restarted (S28). When restarting the autonomous traveling, it can be restarted automatically, or restarted after checked by a supervisor. The supervisor may operate switches for checking various items or a restart switch on the remote controller 112 to check safety, or to confirm resolution of a failure or abnormality, and restart the operation afterwards. When restarting the operation, an alert may be given by a sound or light to notify the restart to anyone around.

Where a hydraulic stepless transmission is used, a means for stopping the traveling shifts the speed change means 44 to a neutral position in addition to activating the brake to stop the traveling. Namely, if the transmission is a hydraulic stepless transmission (HST), the speed change means configured with a solenoid or a motor is activated to shift the movable swash plate of the variable capacity hydraulic pump to a neutral position. Where the vehicle uses an electric motor for the traveling, it is stopped by controlling the output rotation to be zero. This way, even when the traveling is stopped during an operation on a slope, the vehicle does not come down on the slope.

Where the transmission is a sliding-mesh gear box, power clutch transmission, or belt-driven stepless transmission, the means for stopping the traveling turns off the main clutch disposed between the output shaft of the engine 3 and the input shaft of the transmission case to stop the traveling and activates the brake. This way, even when the traveling is stopped on a slope, the vehicle does not come down on the slope.

When the traveling is stopped, the PTO switch 45 is operated to turn off the PTO clutch to stop the implement, while the rpm of the engine 3 is lowered to that of idling speed. This way, no sudden unintended movement will occur, and the worked field is prevented from being damaged. The engine rpm during the stop can be set suitably.

When the autonomous travel work vehicle 1 comes to a halt due to an engine stop caused by an increased load or the like during the operation, the operator stops the operation and gets on the autonomous travel work vehicle 1. The operator then restarts the engine and performs an operation to circumvent the problem that has caused the load buildup. For example, the operator may lift up the implement, or shift down to reduce the speed. When the vehicle circumvents and passes the area with a high load, the normal operation is restarted.

The controller 30 executes control to stop the autonomous traveling when the signal from a GPS satellite (navigation satellite) 37 assumes an abnormal level, so that the vehicle is stopped before it deviates largely from the preset travel path R, and thus deterioration in the work precision is avoided.

The controller 30 executes control to stop the traveling when the actual position deviates from the preset travel path R by more than a preset range, so that the vehicle is stopped before it deviates largely from the preset travel path R, and deterioration in the work precision is avoided. Also, the vehicle is prevented from becoming unable to move by getting stuck deep, or riding over an obstacle.

The controller 30 executes control to stop the traveling when a detected value from the steering sensor 20 assumes an abnormal value (for example, a detected value not changing at all, or changing too largely, or exceeding a detectable range). Therefore, the steering actuator 40 is prevented from being activated with the steering sensor 20 outputting an abnormal value, and the vehicle is prevented from moving in an unintended direction. Also, the controller 30 executes control to stop the traveling when a difference between a detected value from the gyro sensor 31 and the direction sensor 32 that detect the orientation and direction and a target value reaches or exceeds a preset value, so that the vehicle is prevented from moving in an unintended direction.

When the traveling is stopped, the controller 30 transmits a cause of the stop to the remote controller 112 provided to the accompanying travel work vehicle 100, to be shown on the display 113 of the remote controller 112, so that the operator can readily recognize the cause of the stop, and quickly react to resolve the issue that has caused the stop. When it is a failure, a maintenance work vehicle can be quickly and easily arranged.

INDUSTRIAL APPLICABILITY

The present invention is applicable to construction machines, agricultural work vehicles and the like that can be stopped automatically when an abnormality occurs.

DESCRIPTION OF REFERENCE SIGNS

1: Autonomous travel work vehicle
30: Controller
40: Steering actuator
44: Speed change means
60: Engine controller
100: Accompanying travel work vehicle
112: Remote controller Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A parallel travel work system, comprising:
   an autonomous travel work vehicle including a position calculator that determines a position of a vehicle body with the use of a satellite positioning system, a steering actuator that activates a steering system, a drive source controller, a speed change means, and a controller that controls said position calculator, said steering actuator, said drive source controller, and said speed change means;
   the autonomous travel work vehicle being controllable to run autonomously along a preset travel path stored in the controller, and being controllable through a remote controller that is located on an accompanying travel work vehicle accompanying and operating with the autonomous travel work vehicle, the accompanying travel work vehicle being separate from the autonomous travel work vehicle, the autonomous travel work vehicle running in front of the accompanying travel work vehicle and the accompanying travel work vehicle running directly behind or diagonally behind the autonomous travel work vehicle separately; and
   the controller being configured to control the autonomous travel work vehicle to stop the autonomous traveling when a signal from a navigation satellite assumes an abnormal value.

2. A parallel travel work system, comprising:
   an autonomous travel work vehicle that includes a position calculator that determines a position of a vehicle body with the use of a satellite positioning system, a steering actuator that activates a steering system, a drive source controller, a speed change means, and a controller that controls said position calculator, said steering actuator, said drive source controller, and said speed change means;
   the autonomous travel work vehicle being controlled to run autonomously along a preset travel path stored in the controller, and being controllable through a remote controller that is located on an accompanying travel work vehicle accompanying and operating with the autonomous travel work vehicle, the autonomous travel work vehicle running in front of the accompanying travel work vehicle and the accompanying travel work vehicle running directly behind or diagonally behind the autonomous travel work vehicle separately; and
   the controller controlling the autonomous travel work vehicle to stop traveling when an actual position deviates from the preset travel path by more than a preset range; and
   wherein, when the traveling is stopped, the controller transmits a cause of the stop to the remote controller provided in the accompanying travel work vehicle, to be shown on a display of the remote controller.

3. A parallel travel work system, comprising:
   an autonomous travel work vehicle that includes a position calculator that determines a position of a vehicle body with the use of a satellite positioning system, a steering actuator that activates a steering system, a drive source controller, a speed change means, and a controller that controls said position calculator, said steering actuator, said drive source controller, and said speed change means;

the autonomous travel work vehicle being controlled to run autonomously along a preset travel path stored in the controller, and being controllable through a remote controller that is located on an accompanying travel work vehicle accompanying and operating with the autonomous travel work vehicle, the accompanying travel work vehicle being separate from the autonomous travel work vehicle, the autonomous travel work vehicle running in front of the accompanying travel work vehicle and the accompanying travel work vehicle running directly behind or diagonally behind the autonomous travel work vehicle separately; and the controller controlling the autonomous travel work vehicle to stop traveling when a detected value from a steering sensor that detects a steering direction assumes an abnormal value.

4. A parallel travel work system, comprising:

an autonomous travel work vehicle that includes a position calculator that determines a position of a vehicle body with the use of a satellite positioning system, a steering actuator that activates a steering system, a drive source controller, a speed change means, and a controller that controls said position calculator, said steering actuator, said drive source controller, and said speed change means;

the autonomous travel work vehicle being controlled to run autonomously along a preset travel path stored in the controller, and being controllable through a remote controller that is located on an accompanying travel work vehicle accompanying and operating with the autonomous travel work vehicle, the accompanying travel work vehicle being separate from the autonomous travel work vehicle, the autonomous travel work vehicle running in front of the accompanying travel work vehicle and the accompanying travel work vehicle running directly behind or diagonally behind the autonomous travel work vehicle separately; and the controller controlling the autonomous travel work vehicle to stop traveling when a difference between a detected value from an orientation/direction sensor and a target value equals to or exceeds a preset value.

5. A parallel travel work system, comprising:

an autonomous travel work vehicle that includes a position calculator that determines a position of a vehicle body with the use of a satellite positioning system, a steering actuator that activates a steering system, a drive source controller, a speed change means, and a controller that controls said position calculator, said steering actuator, said drive source controller, and said speed change means;

the autonomous travel work vehicle being controlled to run autonomously along a preset travel path stored in the controller, and being controllable through a remote controller that is located on an accompanying travel work vehicle accompanying and operating with the autonomous travel work vehicle, the accompanying travel work vehicle being separate from the autonomous travel work vehicle, the autonomous travel work vehicle running in front of the accompanying travel work vehicle and the accompanying travel work vehicle running directly behind or diagonally behind the autonomous travel work vehicle separately; and the controller controlling being connected to a level sensor provided in a fuel tank and controlling the autonomous travel work vehicle to stop traveling when a remaining amount of fuel is not more than a preset value.

6. The parallel travel work system according to claim 1, wherein:

when the traveling is stopped, the controller transmits a cause of the stop to the remote controller provided in the accompanying travel work vehicle, to be shown on a display of the remote controller.

* * * * *